(12) United States Patent
Wu et al.

(10) Patent No.: US 10,801,608 B2
(45) Date of Patent: Oct. 13, 2020

(54) HARMONIC REDUCER WITH AN OIL GUIDING RING

(71) Applicant: HIWIN TECHNOLOGIES CORP., Taichung (TW)

(72) Inventors: Jian-Syun Wu, Taichung (TW); Cheng-Lung Wang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 233 days.

(21) Appl. No.: 16/176,646

(22) Filed: Oct. 31, 2018

(65) Prior Publication Data

US 2020/0132185 A1    Apr. 30, 2020

(51) Int. Cl.
    *F16H 57/04*        (2010.01)
    *F16H 49/00*        (2006.01)
    *F16H 57/02*        (2012.01)

(52) U.S. Cl.
    CPC ....... *F16H 57/0427* (2013.01); *F16H 49/001* (2013.01); *F16H 57/02* (2013.01); *F16H 57/045* (2013.01); *F16H 57/048* (2013.01); *F16H 57/0471* (2013.01)

(58) Field of Classification Search
CPC ... F16H 49/001; F16H 57/0427; F16H 57/045
USPC .......................................................... 74/640
See application file for complete search history.

(56) References Cited

U.S. PATENT DOCUMENTS

| | | | | |
|---|---|---|---|---|
| 5,984,048 A * | 11/1999 | Kiyosawa | ............. | F16H 49/001 184/6.12 |
| 6,615,689 B2 * | 9/2003 | Kobayashi | .............. | F16C 33/30 74/640 |
| 6,837,821 B2 * | 1/2005 | Teraoka | .................. | F16H 48/22 192/34 |
| 7,905,326 B2 * | 3/2011 | Kiyosawa | ............. | F16H 49/001 184/6.12 |
| 8,516,924 B2 * | 8/2013 | Pen | ........................ | F16H 49/001 74/640 |

FOREIGN PATENT DOCUMENTS

| TW | I592590 B2 | 7/2017 |
|---|---|---|
| TW | M561745 B1 | 6/2018 |

* cited by examiner

*Primary Examiner* — Ha Dinh Ho
(74) *Attorney, Agent, or Firm* — Wang Law Firm, Inc.

(57) ABSTRACT

A harmonic reducer with an oil guiding ring, wherein an oil guiding ring is disposed in an accommodating space of a flexible external gear, and the oil guiding ring is sleeved on a coupling member and located between a first housing and a flexible bearing. Therefore, after lubricant oil is injected through the oil filling hole of the first housing, the lubricant oil enters an annular oil storage groove through the oil inlet holes of the oil guiding ring. When the wave generator rotates, the lubricant oil in the annular oil storage groove is guided to the flexible bearing of the wave generator by the annular wall surface to lubricate the flexible bearing. Therefore, on the basis of effective lubrication, the harmonic reducer can avoid the foreign body impurity caused by insufficient lubrication, and at the same time, does not have to change the original design.

11 Claims, 8 Drawing Sheets

HARMONIC REDUCER WITH AN OIL GUIDING RING

BACKGROUND

Field of the Invention

The present invention relates to a harmonic reducer, and more particularly to a harmonic reducer with an oil guiding ring.

Related Prior Art

Referring to FIG. 1A, one of the drawings of a Taiwan patent (TW 1592590), which is a harmonic reducer of a lubricating retainer 111, wherein a lubrication space 113 is formed by a lubricating retainer 111 and an oil seal 112, so that a bearing 114, a cam 115 and an Oldham coupler 116 can be sufficiently lubricated in the lubrication space 113 to prolong the life and reduce the wear.

However, this patent is provided with the lubricating retainer 111, and the lubrication space 113 is formed between the lubricating retainer 111 and the oil seal 112 and an accommodating portion 1171 of a flexible gear 117, so that, during the operation, the lubricating retainer 111 and the accommodating portion 1171 corresponding to the external teeth of the flexible gear 117 are likely to rub against each other to generate heat and wear, and the foreign matter inside the reducer is increased to accelerate the wear of the reducer.

Referring to FIG. 1B, one of the drawings of the Taiwan patent (TWM561745), which is an automatic lubricating device for a reducer, wherein an oil groove 1311 of a seal cover unit 131 is provided with a first oil hole 1312 corresponding to a flexible bearing 132 and a second oil hole 1313 corresponding to the meshing of an inner teeth 1331 and an outer teeth 1341. Therefore, a pressurizing unit 135 generates a pressurized gas for pushing a piston 136, so that the piston 136 pushes a lubricant oil 137 in the oil groove 1311, and the lubricant oil 137 is output from the first oil hole 1312 and the second oil hole 1313 to lubricate the flexible bearing 132, and the meshing portion between the inner teeth 1331 of a rigid internal gear 133 and the outer teeth 1341 of the flexible external gear 134, respectively, so as to improve the service life.

However, since the seal cover unit 131 is formed by a cover 1314 and a seal member 1315 screwed together, the cover 1314 has an annular oil groove 1311 for storing lubricant oil 137 and a first oil filling hole 1312 and a second oil filling hole 1313 communicating with the oil groove 1311, and the annular oil groove 1311 and the first and second oil filling holes 1312, 1313 must be used in combination with the piston 136 and the pressurizing unit 135. Therefore, the original change will be changed. Therefore, the original design will be changed to increase the overall volume of the reducer, and at the same time, the cost of the parts will be greatly increased.

The present invention has arisen to mitigate and/or obviate the afore-described disadvantages.

SUMMARY

The object of the present invention is to provide a harmonic reducer with an oil guiding ring, which, on the basis of effective lubrication, does not generate foreign matter impurities due to abrasion.

Another object of the present invention is to provide a harmonic reducer with an oil guiding ring, which, on the basis of effective lubrication, does not need to change the size of the original reducer.

To achieve the above objects, a harmonic reducer with an oil guiding ring in accordance with the present invention, comprises:

a harmonic reducer module including a first housing, a crossed roller bearing, a rigid internal gear, a flexible external gear, a wave generator, and a second housing;

the first housing has an oil filling hole;

the crossed roller bearing has a bearing outer ring fixed to the first housing, and a bearing inner ring pivoted relative to the bearing outer ring;

the rigid internal gear is fixed to the bearing inner ring and has a plurality of internal teeth;

the flexible external gear has a main body fixed between the first housing and the bearing outer ring, and a flexible tubular portion connected to the main body, the flexible tubular portion includes a plurality of external teeth engaged with the internal teeth, and an accommodating space communicating with the oil filling hole;

the wave generator has a coupling member and a flexible bearing, the coupling member is pivotally disposed on the first housing and inserted in the accommodating space, the flexible bearing is located between the flexible tubular portion and the coupling member, and disposed in the accommodating space;

the second housing is fixed to the rigid internal gear and sleeved on the coupling member; and the oil guiding ring is disposed in the accommodating space and located between the first housing and the flexible bearing, the oil guiding ring has a fixing hole for insertion of the coupling member, a first annular end surface facing the flexible bearing, a second annular end surface facing the first housing, an annular oil storage groove recessed in the first annular end surface and having a notch facing the flexible bearing, and a plurality of oil inlet holes recessed in the second annular end surface and communicating with the annular oil storage groove.

The effect of the present invention is that the oil guiding ring is disposed in the original accommodating space of the flexible external gear, and the oil guiding ring is sleeved on the coupling member and located between the first housing and the flexible bearing. Therefore, after the lubricant oil is injected through the oil filling hole of the first housing, the lubricant oil enters the annular oil storage groove through the oil inlet holes of the oil guiding ring. When the wave generator rotates, the lubricant oil in the annular oil storage groove is guided to the flexible bearing of the wave generator by the annular wall surface to lubricate the flexible bearing. Therefore, on the basis of effective lubrication, the invention can avoid the foreign body impurity caused by insufficient lubrication, and at the same time, does not have to change the original design.

Preferably, the annular oil storage groove of the oil guiding ring has an annular bottom surface and an annular wall surface connected to the annular bottom surface, the annular wall surface is inclined, and is gradually expanded toward the first annular end surface from the annular bottom surface, so that the lubricant oil injected into the oil filling hole can be guided to the flexible bearing.

Preferably, the oil inlet holes of the oil guiding ring are connected between the second annular end surface and the annular bottom surface.

Preferably, the oil inlet holes of the oil guiding ring are gradually expanded from the annular bottom surface toward the second annular end surface.

Preferably, the harmonic reducer module further includes a first bearing disposed between the first housing and the coupling member, and the first bearing is aligned to the oil inlet holes of the oil guiding ring.

Preferably, the oil guiding ring is further provided with an annular recess recessed from the annular bottom surface, and the annular recess and the annular peripheral surface of the coupling member define a none-return space.

Preferably, the oil guiding ring further has an annular groove recessed in the annular bottom surface and connected between the annular bottom surface and the annular wall surface.

Preferably, the oil filling hole of the first housing and each of the oil inlet holes of the oil guiding ring form an oil injection passage.

Preferably, the oil guiding ring is made of plastic or metal.

Preferably, a gap is formed between the flexible tubular portion of the flexible external gear and the oil guiding ring.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1A:
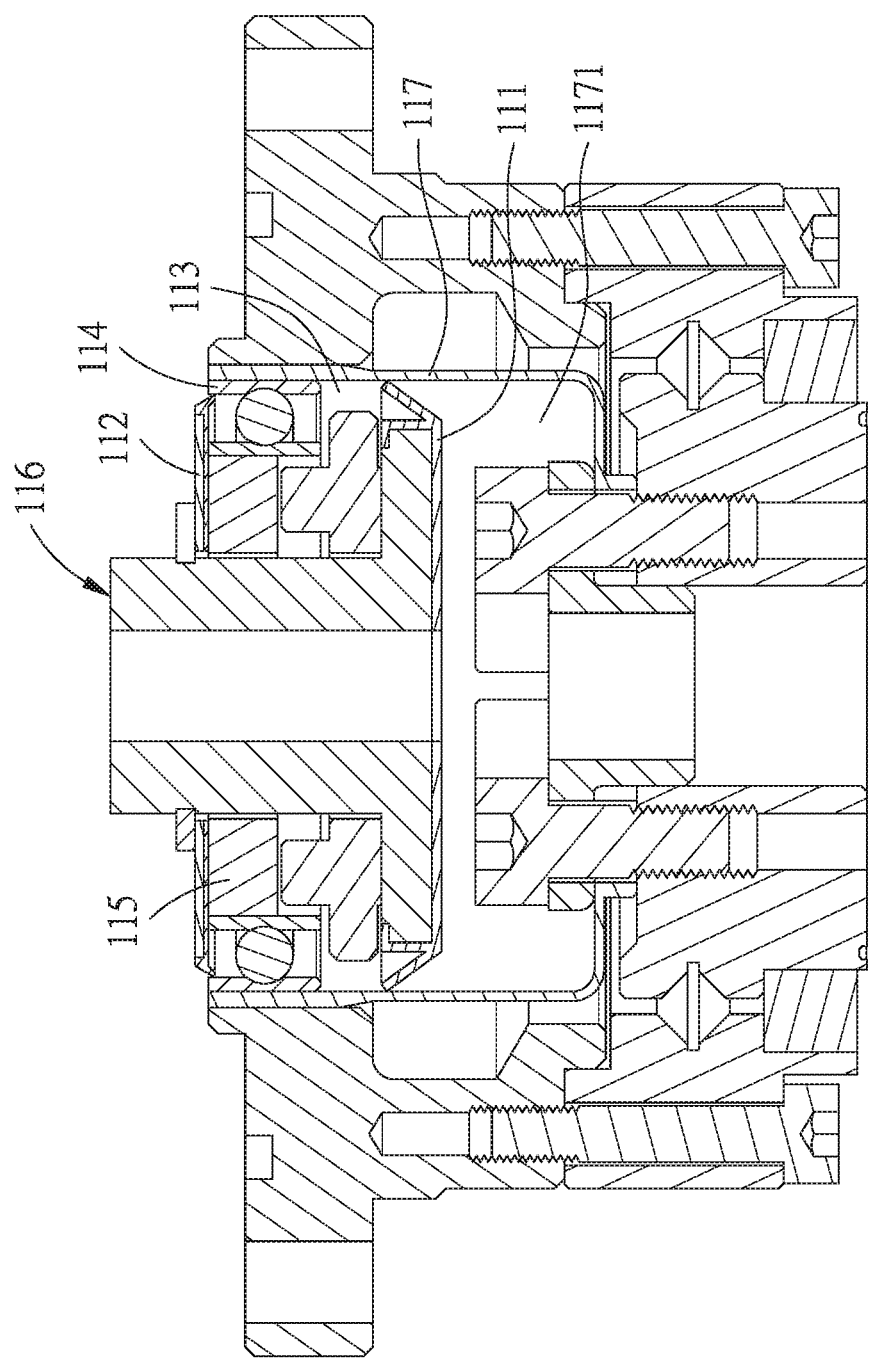
FIG. 1A is one of the drawings of a Taiwan patent (TW 1592590)
Figure 1B:
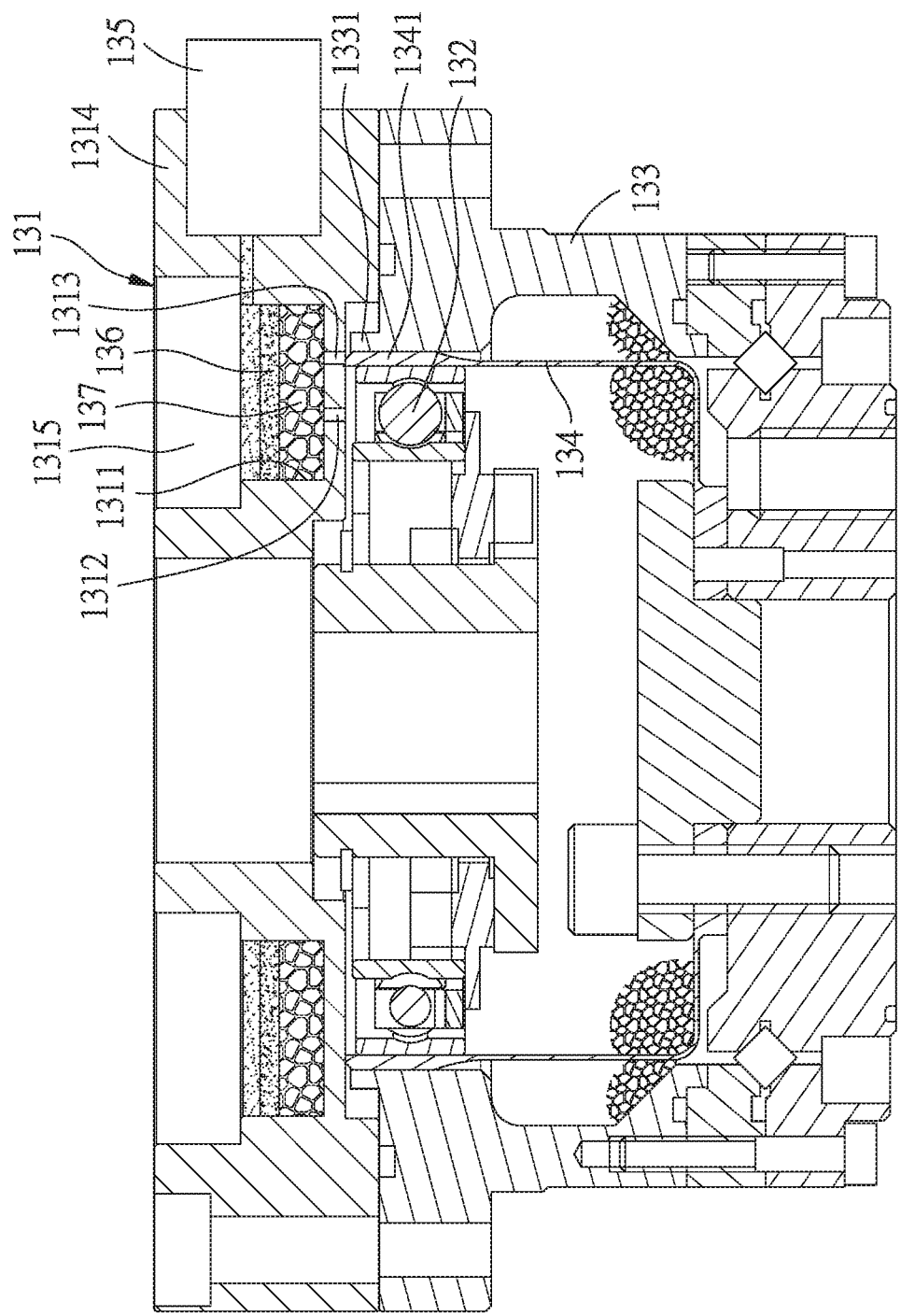
FIG. 1B is one of the drawings of the Taiwan patent (TWM561745)
Figure 2:
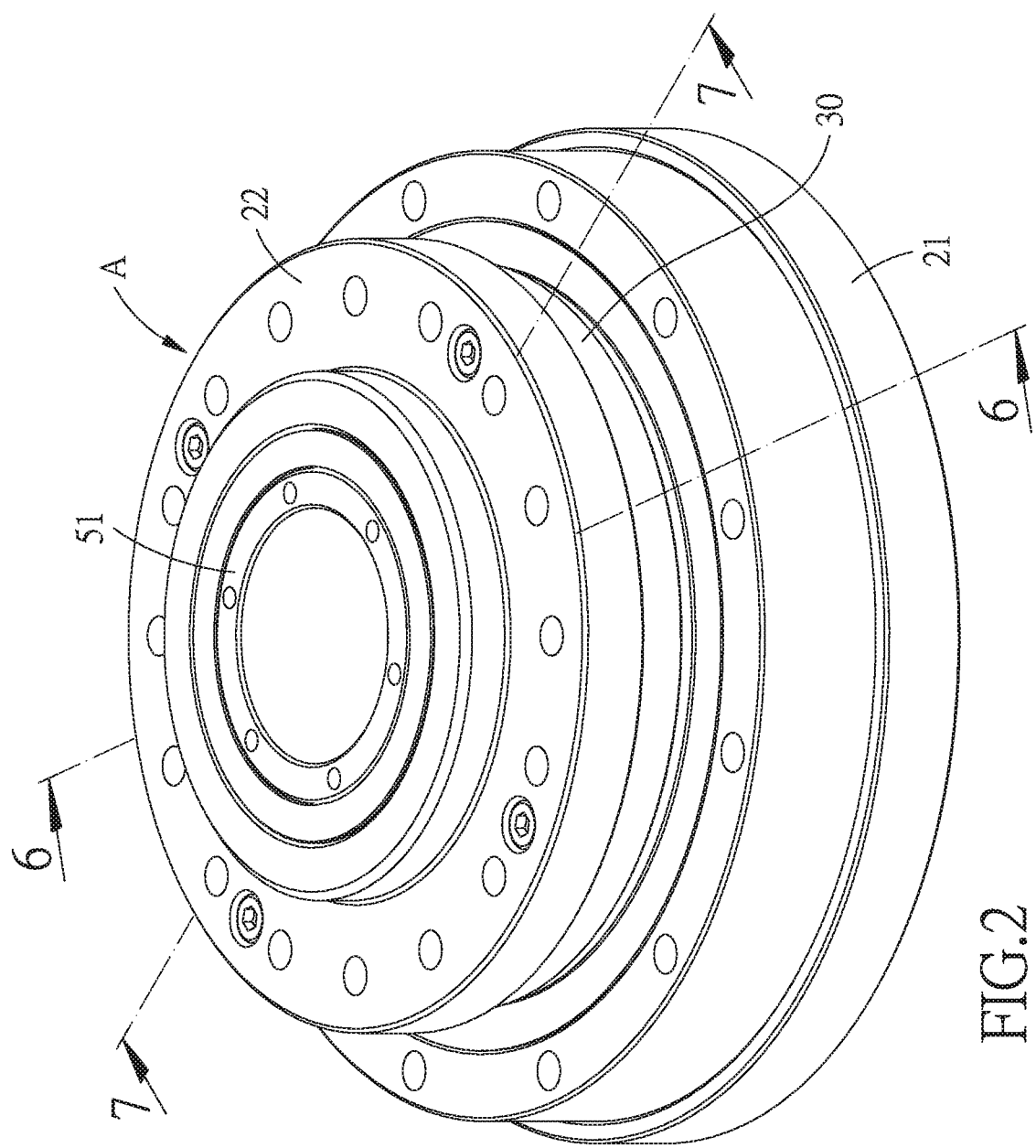
FIG. 2 is a perspective assembled view of an embodiment of the present invention.
Figure 3:
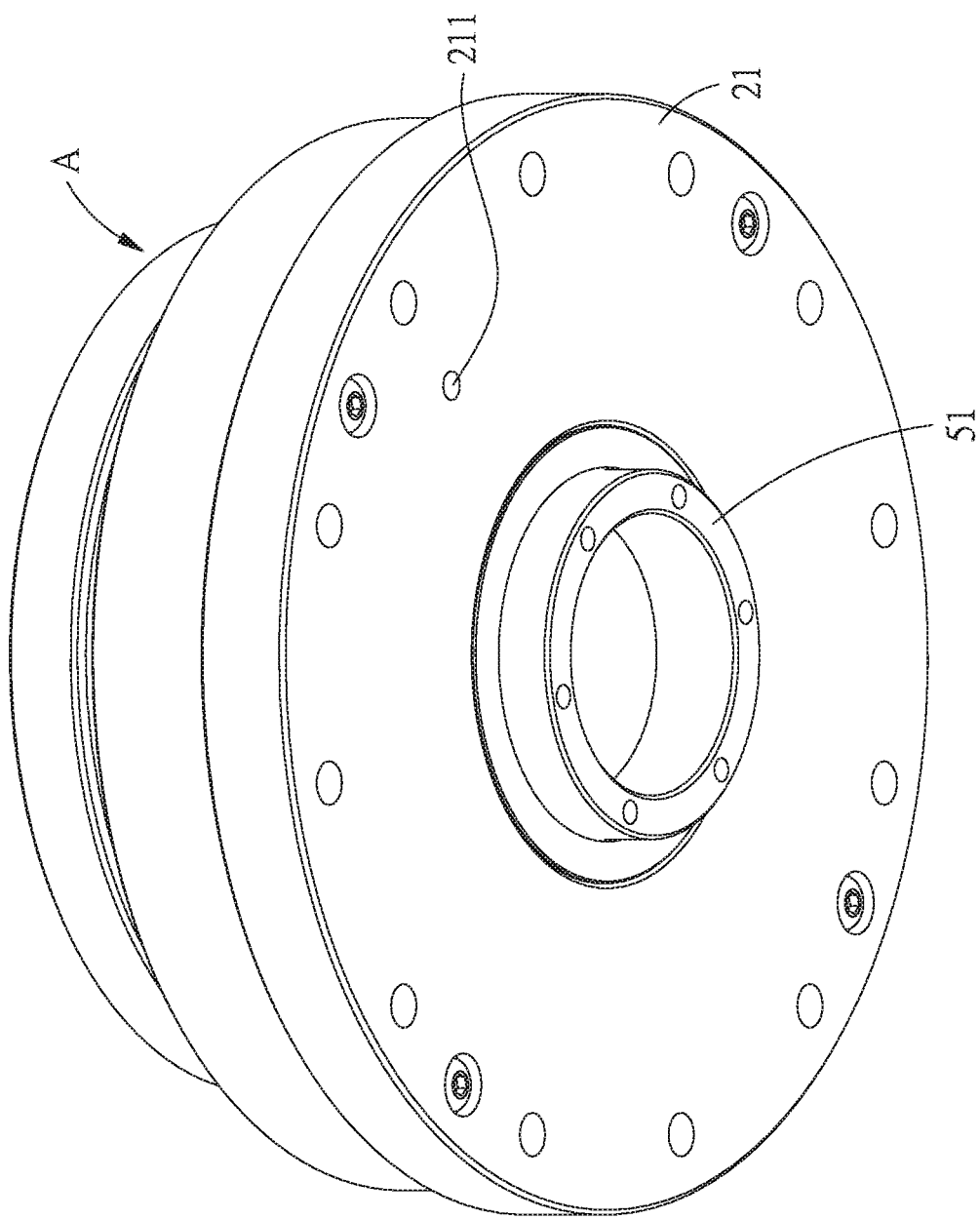
FIG. 3 is another perspective view of an embodiment of the present invention.

The present invention will be clearer from the following description when viewed together with the accompanying drawings, which show, for purpose of illustrations only, the preferred embodiment in accordance with the present invention.

Referring to FIGS. 2-7, an embodiment of the present invention provides a harmonic reducer with an oil guiding ring 70, which mainly comprises a harmonic reducer module A and the oil guiding ring 70.

The harmonic reducer module A includes a first housing 21, a crossed roller bearing 25, a rigid internal gear 30, a flexible external gear 40, a wave generator 50, a second housing 22, a first bearing 61, and a second bearing 62.

The first housing 21 has an oil filling hole 211.

The crossed roller bearing 25 has a bearing outer ring 251 fixed to the first housing 21, a bearing inner ring 252 pivoted relative to the bearing outer ring 251, and a plurality of rollers 253 disposed between the bearing outer ring 251 and the bearing inner ring 252.

The rigid internal gear 30 is fixed to the bearing inner ring 252 and has a plurality of internal teeth 31.

The flexible external gear 40 is in the shape of a hat, and has a main body 41 fixed between the first housing 21 and the bearing outer ring 251, and a flexible tubular portion 42 connected to the main body 41 and extending in an axial direction. The flexible tubular portion 42 is flexible in the axial direction, and includes: a plurality of external teeth 421 engaged with the internal teeth 31, and an accommodating space 422 communicating with the oil filling hole 211. The wave generator 50 has a coupling member 51 and a flexible bearing 52. The coupling member 51 is pivotally disposed on the first housing 21 and inserted in the accommodating space 422. The flexible bearing 52 is located between the flexible tubular portion 42 and the coupling member 51, and disposed in the accommodating space 422.

The second housing 22 is fixed to the rigid internal gear 30 and sleeved on the coupling member 51, and the coupling member 51 is pivotally disposed in the second housing 22.

The first bearing 61 is disposed between the first housing 21 and the coupling member 51 to provide a state in which the coupling member 51 is pivotally disposed in the first housing 21.

The second bearing 62 is disposed between the second housing 22 and the coupling member 51 to provide a state in which the coupling member 51 is pivotally disposed in the second housing 22.

The oil guiding ring 70 is disposed in the accommodating space 422 and located between the first housing 21 and the flexible bearing 52. The oil guiding ring 70 has a fixing hole 71 for insertion of the coupling member 51, a first annular end surface 72 facing the flexible bearing 52, a second annular end surface 73 facing the first housing 21, an annular oil storage groove 74 recessed in the first annular end surface 72 and having a notch 741 facing the flexible bearing 52, and a plurality of oil inlet holes 75 recessed in the second annular end surface 73 and communicating with the annular oil storage groove 74.

Figure 4:
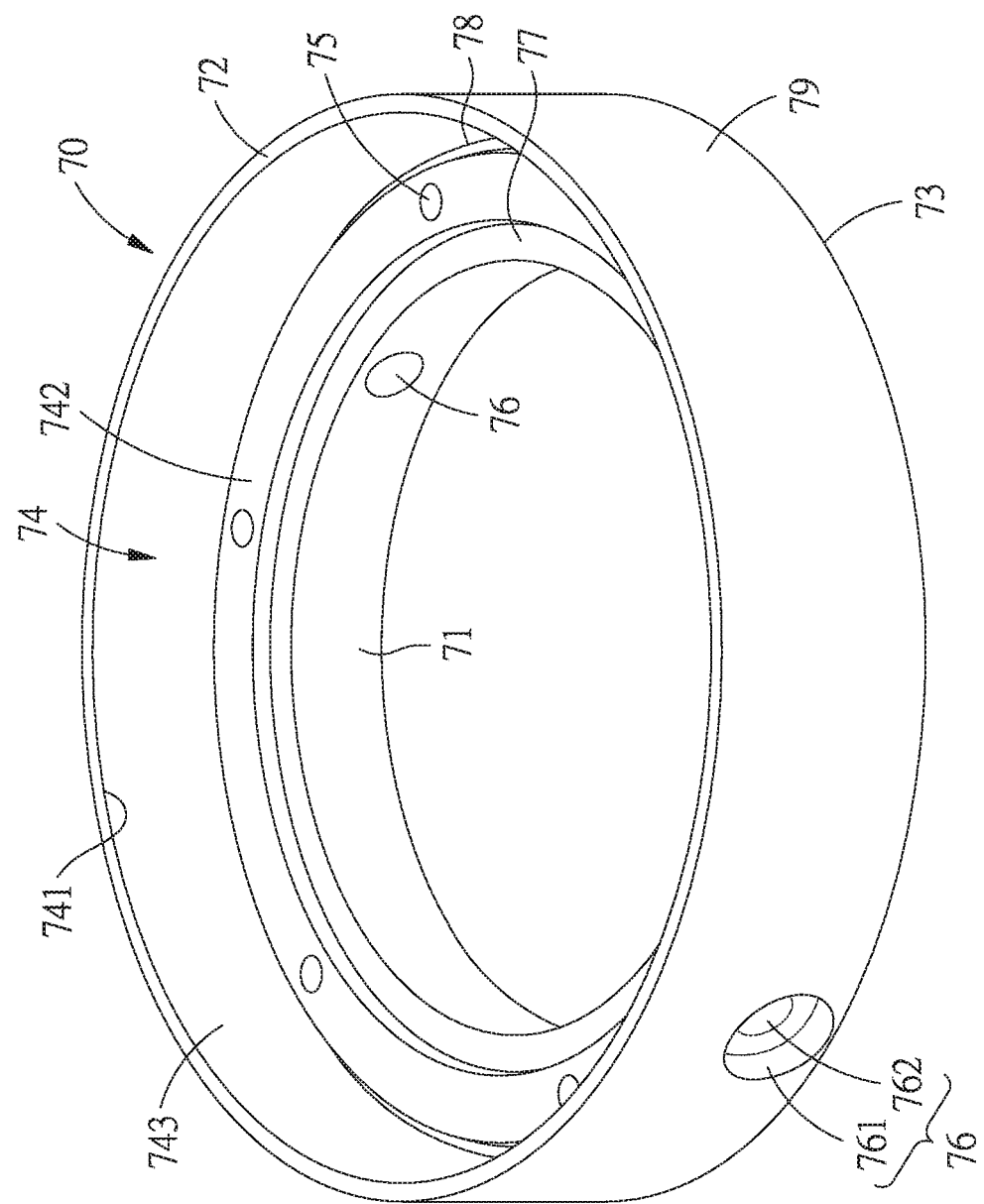
FIG. 4 is a perspective view of the embodiment of the present invention, showing the three-dimensional state of the oil guiding ring.
Figure 5:
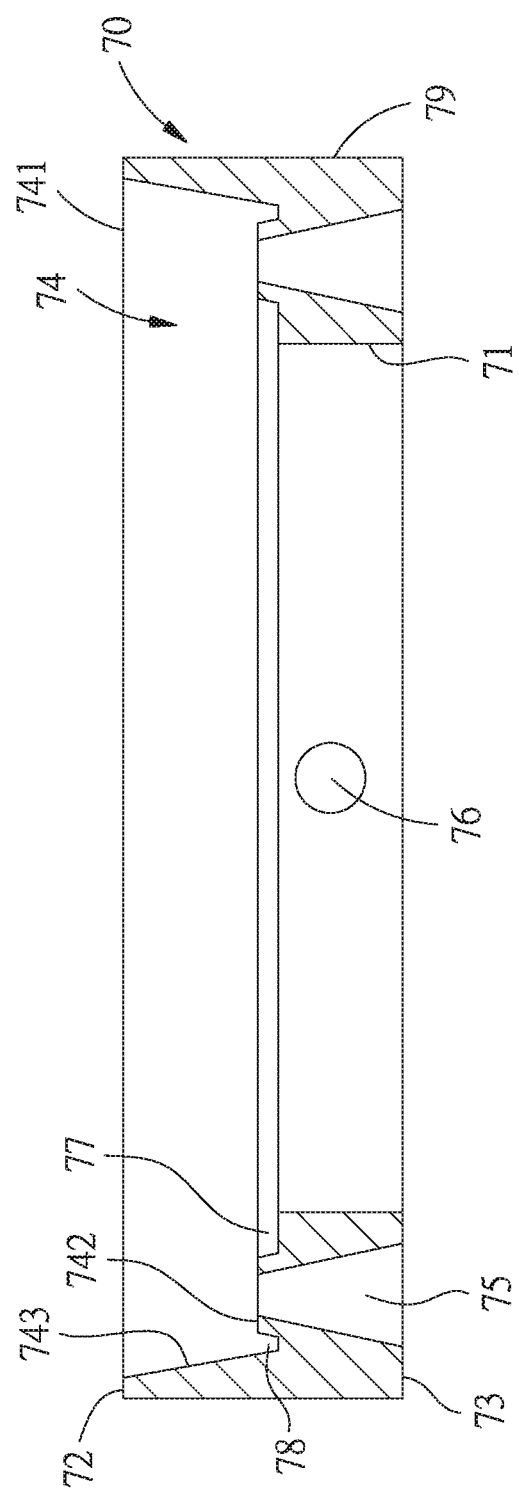
FIG. 5 is a cross-sectional view of an embodiment of the present invention, showing a cross-sectional state of the oil guiding ring.
Figure 6:
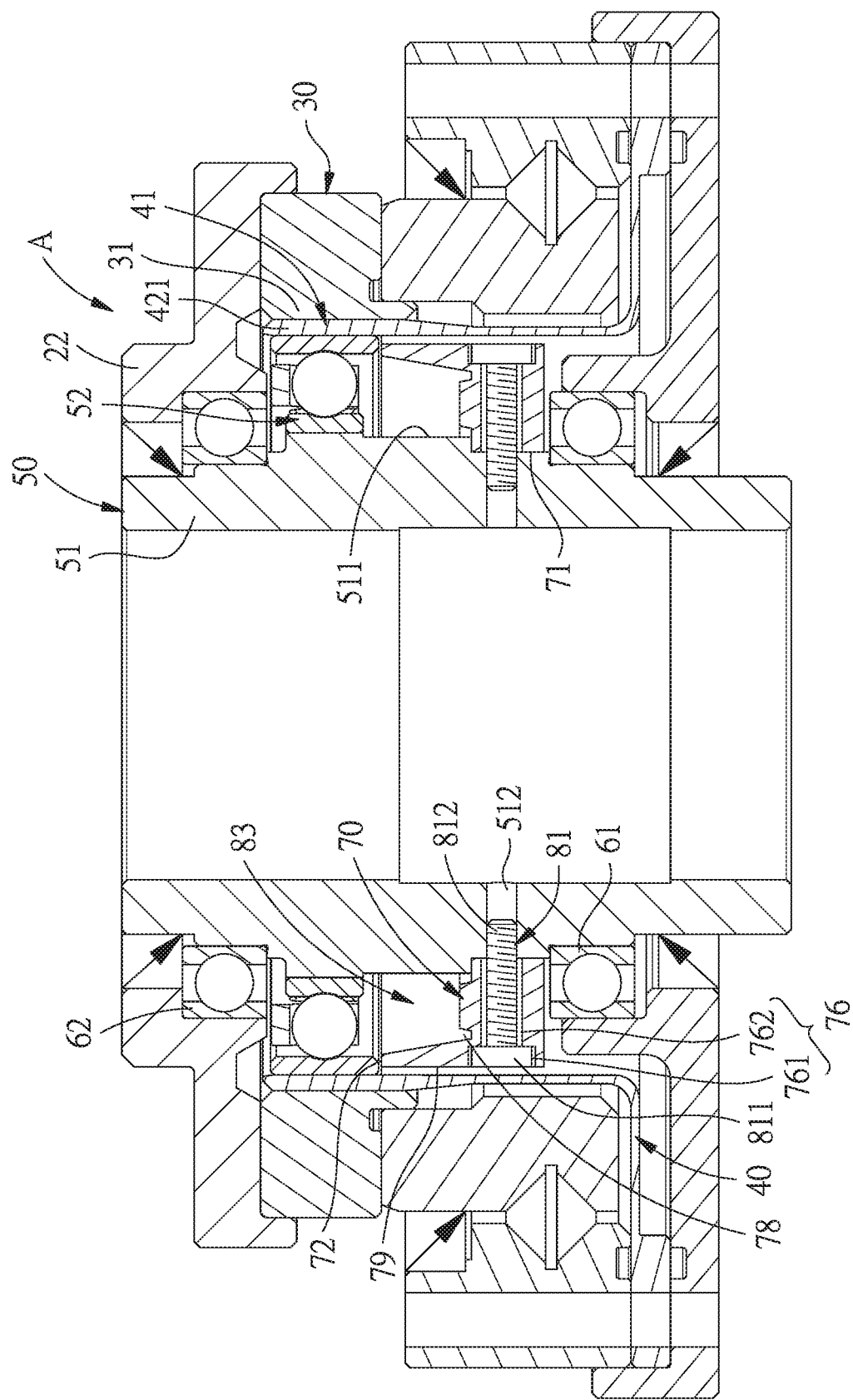
FIG. 6 is a cross-sectional view taken along the line 6-6 of FIG. 2.

In this embodiment, as shown in FIGS. 4 and 6, the oil guiding ring 70 further has two through holes 76 which are radially connected to the fixing hole 71 from the annular side surface 79 thereof. Each of the through holes 76 is in the shape of a fish eye and has a first aperture portion 761 recessed from the annular side surface 79, and a second aperture portion 762 that communicates with the first aperture portion 761 and has a diameter smaller than that of the first aperture portion 761. An annular peripheral surface 511 of the coupling member 51 is radially provided with two threaded holes 512. The two through holes 76 are respectively provided with a screw 81 which is inserted into each of the through holes 76 and screwed in a corresponding one of the threaded holes 512, in such a manner that a head 811 of the screw 81 abuts against the first aperture portion 761, and a shaft portion 812 of the screw 81 is inserted through the second aperture portion 762 and screwed into the corresponding one of threaded holes 512 of the coupling member 51, so that the oil guiding ring 70 is sleeved on the coupling member 51. In addition, the annular oil storage groove 74 of the oil guiding ring 70 and the annular peripheral surface 511 of the coupling member 51 define an oil storage space 83 therebetween. The annular oil storage groove 74 of the oil guiding ring 70 has an annular bottom surface 742 and an annular wall surface 743 connected to the annular bottom surface 742. The annular wall surface 743 is inclined, and is gradually expanded toward the first annular end surface 72 from the annular bottom surface 742, so that the annular wall surface 743 is inclined toward the flexible bearing 52. At the same time, the oil inlet holes 75 are connected between the second annular end surface 73 and the annular bottom surface 742, and is gradually expanded from the annular bottom surface 742 toward the second annular end surface 73, namely, in a tapered hole shape. Each of the oil inlet holes 75 is aligned to the first bearing 61, and the oil filling hole 211 of the first housing 21 and each of the oil inlet holes 75 of the oil guiding ring 70 form an oil injection passage 85. Furthermore, the oil guiding ring 70 is made of plastic, and of course can also be made of metal. When the oil guiding ring 70 is made of plastic, the manufacturing cost can be reduced. When the oil guiding ring 70 is made of metal, the service life can be extended. Further, a gap H is formed between the flexible tubular portion 42 of the flexible external gear 40 and the oil guiding ring 70.

The above is the configuration of the main components of the embodiment of the present invention, and the actuation mode and efficacy of the invention are described below.

Figure 7:
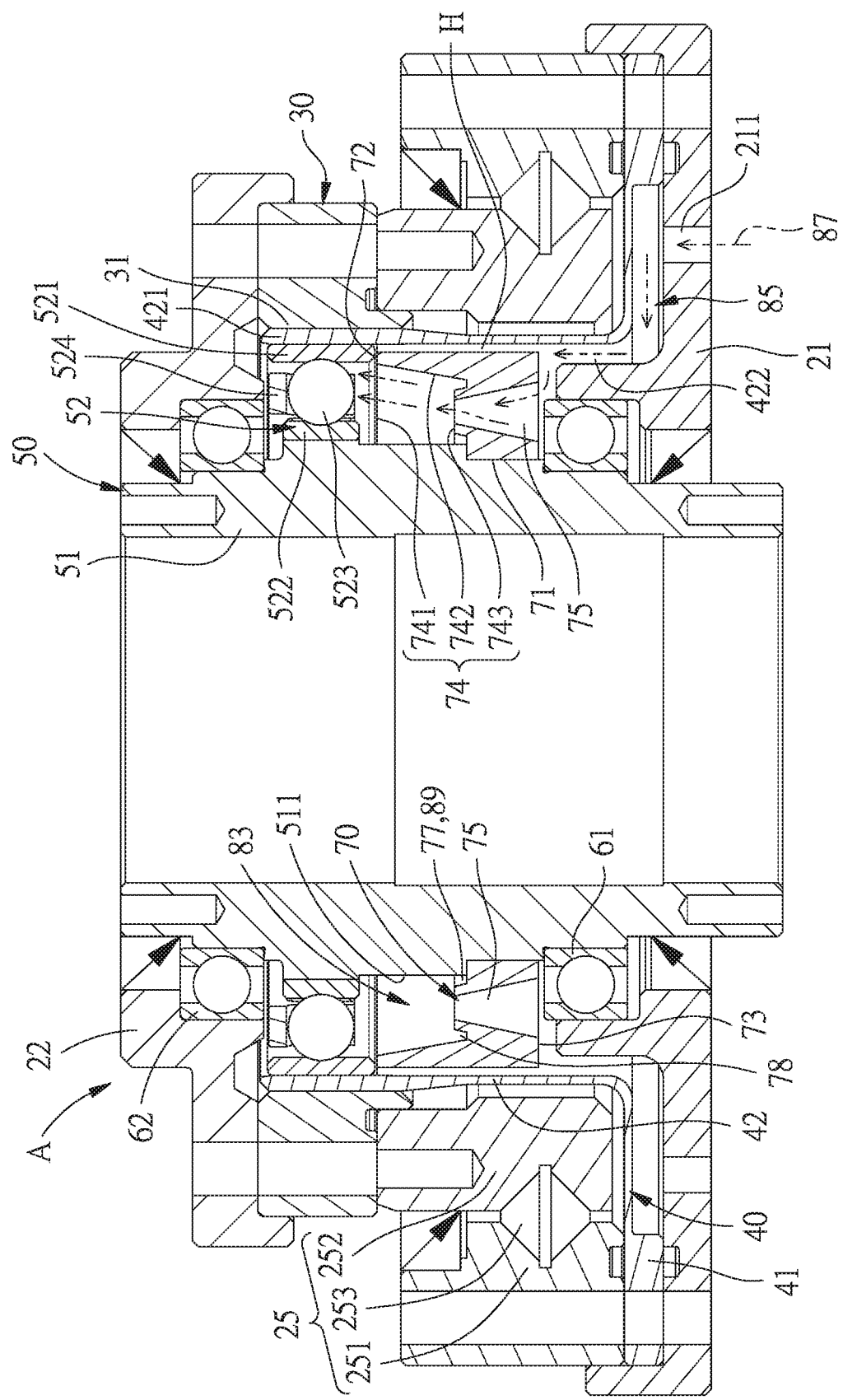
FIG. 7 is a cross-sectional view taken along the line 7-7 of FIG. 2.

Referring to FIG. 7, when the lubricant oil 87 (indicated by the arrow) is injected into the oil filling hole 211 of the first housing 21, the lubricant oil 87 flows from the oil filling hole 211 of the first housing 21 to the oil storage space 83 defined by the annular oil storage groove 74 of the oil guiding ring 70 and the annular peripheral surface 511 of the coupling member 51 via the oil injection passage 85 formed between the oil filling hole 211 of the first housing 21 and each of the oil inlet holes 75 of the oil guiding ring 70. When the coupling member 51 of the wave generator 50 rotates, the rotating coupling member 51 synchronously drives the oil guiding ring 70, and then the lubricant oil 87 in the oil guiding ring 70 is guided to the flexible bearing 52 through the inclined annular wall surface 743, thereby lubricating the flexible bearing 52 to increase the life of the harmonic reducer while avoiding waste of the lubricant oil 87.

Since the oil guiding ring 70 is disposed in the accommodating space 422 of the flexible external gear 40, and sleeved on the coupling member 51 and located between the first housing 21 and the flexible bearing 52, after the lubricant oil 87 is injected into the oil filling hole 211 of the first housing 21, the lubricant oil 87 will flow into the annular oil storage groove 74 via the oil inlet holes 75 of the oil guiding ring 70. When the wave generator 50 rotates, the lubricant oil 87 in the annular oil storage groove 74 can be guided to the flexible bearing 52 of the wave generator 50 by its annular wall surface 743 to lubricate the flexible bearing 52, Therefore, on the basis of effective lubrication, the invention can avoid the foreign body impurity caused by insufficient lubrication, and at the same time, it is not necessary to change the external size of the original reducer.

It is worth mentioning that, since each of the oil inlet holes 75 of the oil guiding ring 70 is a tapered hole and aligned to the first bearing 61, and each of the oil inlet holes 75 is gradually expanded toward the first bearing 61, so that the lubricant oil 87 in each of the oil inlet holes 75 will flow along the inner surface of the oil inlet holes 75 to the first bearing 61 to lubricate the first bearing 61, thus improving the service life of the first bearing 61.

In this embodiment, the oil guiding ring 70 is further provided with an annular recess 77 recessed from the annular bottom surface 742, and the annular recess 77 and the annular peripheral surface 511 of the coupling member 51 define a none-return space 89. The oil guiding ring 70 further has an annular groove 78 recessed in the annular bottom surface 742 and connected between the annular bottom surface 742 and the annular wall surface 743. Therefore, the none-return space 89 and the annular groove 78 are both lower than the annular bottom surface 742 of the annular oil storage groove 74. Therefore, by the small end diameter of the non-return space 89, the annular groove 78 and the oil inlet hole 75, it is possible to prevent the lubricant oil 87 in the annular oil storage groove 74 from flowing away from the small ends of the oil inlet holes 75 communicating with the annular oil storage groove 74, thereby ensuring that, when the wave generator 50 rotates, the lubricant oil 87 remains in the oil storage space 83 to lubricate the flexible bearing 52.

It should be noted that, in this embodiment, a gap H is formed between the oil guiding ring 70 and the flexible tubular portion 42 of the flexible external gear 40, so that, under the basis of effective lubrication, the oil guiding ring 70 and the flexible tubular portion 42 won't generate foreign matter impurities due to abrasion.

Finally, referring to FIG. 7, in the present embodiment, the flexible bearing 52 includes a flexible outer ring 521, a flexible inner ring 522, a plurality of rolling elements 523 disposed between the flexible inner and outer rings 522, 521, and a retainer 524 disposed at one end of the flexible inner and outer rings 522, 521. The flexible bearing 52 is assembled such that the retainer 524 is away from the oil guiding ring 70, that is, an open end surface of the flexible bearing 52 is opposite to the oil guiding ring 70. Thus, when the wave generator 50 rotates, the lubricant oil 87 can be directly guided into the flexible bearing 52 by the annular wall surface 743 of the annular oil storage groove 74 without being stopped by the retainer 524, and thus the flexible bearing 52 can be effectively lubricated.

While we have shown and described various embodiments in accordance with the present invention, it is clear to those skilled in the art that further embodiments may be made without departing from the scope of the present invention.

What is claimed is:

1. A harmonic reducer with an oil guiding ring, comprising:
    a harmonic reducer module including a first housing, a crossed roller bearing, a rigid internal gear, a flexible external gear, a wave generator, and a second housing;
    the first housing has an oil filling hole;
    the crossed roller bearing has a bearing outer ring fixed to the first housing, and a bearing inner ring pivoted relative to the bearing outer ring;
    the rigid internal gear is fixed to the bearing inner ring and has a plurality of internal teeth;
    the flexible external gear has a main body fixed between the first housing and the bearing outer ring, and a flexible tubular portion connected to the main body, the flexible tubular portion includes a plurality of external teeth engaged with the internal teeth, and an accommodating space communicating with the oil filling hole;
    the wave generator has a coupling member and a flexible bearing, the coupling member is pivotally disposed on the first housing and inserted in the accommodating space, the flexible bearing is located between the flexible tubular portion and the coupling member, and disposed in the accommodating space;

the second housing is fixed to the rigid internal gear and sleeved on the coupling member; and the oil guiding ring is disposed in the accommodating space and located between the first housing and the flexible bearing, the oil guiding ring has a fixing hole for insertion of the coupling member, a first annular end surface facing the flexible bearing, a second annular end surface facing the first housing, an annular oil storage groove recessed in the first annular end surface and having a notch facing the flexible bearing, and a plurality of oil inlet holes recessed in the second annular end surface and communicating with the annular oil storage groove.

2. The harmonic reducer with the oil guiding ring as claimed in claim 1, wherein the annular oil storage groove of the oil guiding ring has an annular bottom surface and an annular wall surface connected to the annular bottom surface, the annular wall surface is inclined, and is gradually expanded toward the first annular end surface from the annular bottom surface.

3. The harmonic reducer with the oil guiding ring as claimed in claim 2, wherein the oil inlet holes of the oil guiding ring are connected between the second annular end surface and the annular bottom surface.

4. The harmonic reducer with the oil guiding ring as claimed in claim 2, wherein the oil inlet holes of the oil guiding ring are gradually expanded from the annular bottom surface toward the second annular end surface.

5. The harmonic reducer with the oil guiding ring as claimed in claim 3, wherein the oil inlet holes of the oil guiding ring are gradually expanded from the annular bottom surface toward the second annular end surface.

6. The harmonic reducer with the oil guiding ring as claimed in claim 1, wherein the harmonic reducer module further includes a first bearing disposed between the first housing and the coupling member, and the first bearing is aligned to the oil inlet holes of the oil guiding ring.

7. The harmonic reducer with the oil guiding ring as claimed in claim 2, wherein the oil guiding ring is further provided with an annular recess recessed from the annular bottom surface, and the annular recess and an annular peripheral surface of the coupling member define a none-return space.

8. The harmonic reducer with the oil guiding ring as claimed in claim 2, wherein the oil guiding ring further has an annular groove recessed in the annular bottom surface and connected between the annular bottom surface and the annular wall surface.

9. The harmonic reducer with the oil guiding ring as claimed in claim 1, wherein the oil filling hole of the first housing and each of the oil inlet holes of the oil guiding ring form an oil injection passage.

10. The harmonic reducer with the oil guiding ring as claimed in claim 1, wherein the oil guiding ring is made of plastic or metal.

11. The harmonic reducer with the oil guiding ring as claimed in claim 1, wherein a gap is formed between the flexible tubular portion of the flexible external gear and the oil guiding ring.

* * * * *